(12) United States Patent
Wang et al.

(10) Patent No.: US 11,997,409 B2
(45) Date of Patent: May 28, 2024

(54) VIDEO PROCESSING METHOD AND APPARATUS, AND TERMINAL AND STORAGE MEDIUM

(71) Applicant: BEIJING BYTEDANCE NETWORK TECHNOLOGY CO., LTD., Beijing (CN)

(72) Inventors: Lili Wang, Beijing (CN); Chi Fang, Beijing (CN); Dong Wang, Beijing (CN); Wei Gao, Beijing (CN); Haizhou Zhu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/773,573

(22) PCT Filed: Oct. 27, 2020

(86) PCT No.: PCT/CN2020/124038
§ 371 (c)(1),
(2) Date: Apr. 29, 2022

(87) PCT Pub. No.: WO2021/083146
PCT Pub. Date: May 6, 2021

(65) Prior Publication Data
US 2022/0377254 A1    Nov. 24, 2022

(30) Foreign Application Priority Data

Oct. 30, 2019  (CN) .......................... 201911047107.0
Oct. 30, 2019  (CN) .......................... 201911047128.2

(51) Int. Cl.
*H04N 5/262*    (2006.01)
*H04N 5/268*    (2006.01)
*H04N 5/77*     (2006.01)

(52) U.S. Cl.
CPC ......... *H04N 5/2624* (2013.01); *H04N 5/2628* (2013.01); *H04N 5/268* (2013.01); *H04N 5/77* (2013.01)

(58) Field of Classification Search
None
See application file for complete search history.

(56) References Cited

U.S. PATENT DOCUMENTS 7,823,056 B1    10/2010    Davey et al.
8,665,333 B1    3/2014     Sharma et al.
(Continued)

FOREIGN PATENT DOCUMENTS

CN    101388988 A    3/2009
CN    102568260 A    7/2012
(Continued)

OTHER PUBLICATIONS

International Patent Application No. PCT/CN2020/124038; Int'l Search Report; dated Jan. 11, 2021; 4 pages.
(Continued)

*Primary Examiner* — Eileen M Adams
(74) *Attorney, Agent, or Firm* — BakerHostetler

(57) ABSTRACT

The embodiments of the disclosure provide a video processing method and apparatus, and terminal and storage medium. The method includes: turning on a first camera on a first side and a second camera on a second side of a terminal in response to a first preset operation, wherein the first side and the second side are opposite or have different directions; and using the first camera and the second camera for simultaneous video recording. According to the method of the disclosure, a video recording method is improved by using the cameras on two sides of the terminal for simultaneous video recording, so that more flexible choices may be provided for video presentation and editing.

20 Claims, 4 Drawing Sheets

Turning on cameras on a first side and a second side of a terminal in response to a first preset operation — S101

Preforming video recording by using the first camera and the second camera simultaneously — S102

(56) References Cited

U.S. PATENT DOCUMENTS

| | | |
|---|---|---|
| 8,953,079 B2 | 2/2015 | Raju et al. |
| 9,325,903 B2 | 4/2016 | Kim et al. |
| 9,349,414 B1 | 5/2016 | Furment et al. |
| 9,491,367 B2 | 11/2016 | Lee et al. |
| 9,509,916 B2 | 11/2016 | Li et al. |
| 9,565,333 B2 | 2/2017 | Kim et al. |
| 9,578,233 B2 | 2/2017 | Aoyama et al. |
| 10,007,476 B1 | 6/2018 | Glikmann |
| 10,136,069 B2 | 11/2018 | Kim et al. |
| 10,200,599 B1 | 2/2019 | Baldwin |
| 10,511,757 B2 | 12/2019 | Yoshizawa et al. |
| 10,652,198 B1 | 5/2020 | Morrison et al. |
| 10,693,956 B1 | 6/2020 | Green et al. |
| 10,944,908 B2 | 3/2021 | An et al. |
| 11,012,639 B2 | 5/2021 | Kim et al. |
| 11,115,591 B2 | 9/2021 | Wei |
| 11,115,598 B2 | 9/2021 | Yim et al. |
| 11,258,736 B2 | 2/2022 | Shelley |
| 11,412,276 B2 | 8/2022 | Bloch et al. |
| 11,470,051 B1 | 10/2022 | Berkas et al. |
| 11,765,463 B2 | 9/2023 | Li et al. |
| 2004/0179816 A1 | 9/2004 | Takehana |
| 2005/0232586 A1 | 10/2005 | Tsuchiya et al. |
| 2009/0141981 A1 | 6/2009 | Chan |
| 2010/0077289 A1 | 3/2010 | Das et al. |
| 2010/0251109 A1 | 9/2010 | Jin et al. |
| 2010/0281375 A1* | 11/2010 | Pendergast ............ G11B 27/34 715/723 |
| 2012/0081392 A1 | 4/2012 | Arthur |
| 2012/0120186 A1 | 5/2012 | Diaz et al. |
| 2012/0268552 A1 | 10/2012 | Choi et al. |
| 2012/0274808 A1 | 11/2012 | Chong et al. |
| 2013/0111366 A1 | 5/2013 | Silbey et al. |
| 2013/0125000 A1 | 5/2013 | Fleischhauer et al. |
| 2013/0227414 A1 | 8/2013 | Hwang et al. |
| 2013/0235224 A1 | 9/2013 | Park et al. |
| 2013/0298026 A1 | 11/2013 | Fitzpatrick |
| 2013/0329100 A1 | 12/2013 | Desai et al. |
| 2014/0047371 A1 | 2/2014 | Palmer et al. |
| 2014/0192212 A1 | 7/2014 | He et al. |
| 2014/0229544 A1 | 8/2014 | Evans et al. |
| 2014/0232904 A1 | 8/2014 | Na et al. |
| 2014/0232906 A1 | 8/2014 | Ha et al. |
| 2014/0240551 A1 | 8/2014 | Kim et al. |
| 2014/0267842 A1 | 9/2014 | Lee et al. |
| 2014/0324605 A1 | 10/2014 | Steelberg et al. |
| 2015/0062434 A1 | 3/2015 | Deng et al. |
| 2015/0163562 A1 | 6/2015 | Leventhal et al. |
| 2015/0277638 A1 | 10/2015 | Bustamante |
| 2015/0288742 A1 | 10/2015 | Flynn et al. |
| 2015/0363811 A1 | 12/2015 | Candillier |
| 2016/0224767 A1 | 8/2016 | Steelberg |
| 2016/0248864 A1 | 8/2016 | Lola et al. |
| 2016/0249108 A1 | 8/2016 | Sexton |
| 2016/0284383 A1 | 9/2016 | Kozakura |
| 2016/0366294 A1 | 12/2016 | Uroskin et al. |
| 2017/0064208 A1 | 3/2017 | Salimpour et al. |
| 2017/0085803 A1 | 3/2017 | Chin et al. |
| 2017/0094019 A1 | 3/2017 | Ahmed et al. |
| 2017/0195615 A1 | 7/2017 | Han et al. |
| 2017/0201714 A1* | 7/2017 | Kim ............ H04N 7/185 |
| 2017/0256288 A1 | 9/2017 | Ai et al. |
| 2017/0289462 A1 | 10/2017 | Eum et al. |
| 2017/0337652 A1 | 11/2017 | Sarin |
| 2018/0033153 A1 | 2/2018 | Hirasawa et al. |
| 2018/0234589 A1 | 8/2018 | Xiao |
| 2018/0376078 A1 | 12/2018 | Adachi et al. |
| 2019/0005253 A1 | 1/2019 | Floury et al. |
| 2019/0014372 A1 | 1/2019 | Kandagal et al. |
| 2019/0019926 A1 | 1/2019 | Lee et al. |
| 2019/0075066 A1 | 3/2019 | Cho et al. |
| 2019/0087938 A1 | 3/2019 | Iddings et al. |
| 2019/0174056 A1 | 6/2019 | Jung et al. |
| 2019/0199926 A1 | 6/2019 | An et al. |
| 2019/0288972 A1 | 9/2019 | Morrison |
| 2019/0342616 A1 | 11/2019 | Domm et al. |
| 2020/0099838 A1 | 3/2020 | Song et al. |
| 2020/0106952 A1 | 4/2020 | Missig et al. |
| 2020/0223454 A1 | 7/2020 | Fox et al. |
| 2020/0302414 A1 | 9/2020 | Pachera |
| 2021/0014415 A1 | 1/2021 | Wei |
| 2021/0021295 A1* | 1/2021 | Yun ............ H04B 1/401 |
| 2021/0026511 A1 | 1/2021 | Ye et al. |
| 2021/0027576 A1 | 1/2021 | Nelson et al. |
| 2021/0051295 A1* | 2/2021 | Khawam ............ G06Q 50/18 |
| 2021/0067741 A1 | 3/2021 | Yoshizawa et al. |
| 2021/0099407 A1 | 4/2021 | Al Majid et al. |
| 2021/0152753 A1 | 5/2021 | Zhu |
| 2021/0297604 A1 | 9/2021 | Matiossian |
| 2022/0159183 A1 | 5/2022 | Li et al. |
| 2022/0239832 A1 | 7/2022 | Tyagi et al. |
| 2022/0294992 A1 | 9/2022 | Manzari et al. |
| 2022/0377254 A1 | 11/2022 | Wang et al. |
| 2023/0007085 A1 | 1/2023 | Berliner et al. |
| 2023/0076870 A1 | 3/2023 | Arnold et al. |
| 2023/0088720 A1 | 3/2023 | Wang et al. |

FOREIGN PATENT DOCUMENTS

| | | |
|---|---|---|
| CN | 102938825 A | 2/2013 |
| CN | 103745736 A | 4/2014 |
| CN | 104104870 A | 10/2014 |
| CN | 104980659 A | 10/2015 |
| CN | 105009566 A | 10/2015 |
| CN | 105103535 A | 11/2015 |
| CN | 105376396 A | 3/2016 |
| CN | 106060526 A | 10/2016 |
| CN | 106165430 A | 11/2016 |
| CN | 106210629 A | 12/2016 |
| CN | 106231095 A | 12/2016 |
| CN | 106559686 A | 4/2017 |
| CN | 106662965 A | 5/2017 |
| CN | 106851162 A | 6/2017 |
| CN | 106973234 A | 7/2017 |
| CN | 107105315 A | 8/2017 |
| CN | 107509029 A | 12/2017 |
| CN | 107566725 A | 1/2018 |
| CN | 107846547 A | 3/2018 |
| CN | 108234891 A | 6/2018 |
| CN | 108419016 A | 8/2018 |
| CN | 109089059 A | 12/2018 |
| CN | 109151537 A | 1/2019 |
| CN | 109167937 A | 1/2019 |
| CN | 109729266 A | 5/2019 |
| CN | 110166652 A | 8/2019 |
| CN | 110740261 A | 1/2020 |
| CN | 110784674 A | 2/2020 |
| CN | 110809100 A | 2/2020 |
| CN | 110830714 A | 2/2020 |
| CN | 111143662 A | 5/2020 |
| CN | 112004032 A | 11/2020 |
| CN | 112445389 A | 3/2021 |
| CN | 306373989 S | 3/2021 |
| CN | 113422903 A | 9/2021 |
| CN | 113497894 A | 10/2021 |
| CN | 114979495 A | 8/2022 |
| CN | 115334246 A | 11/2022 |
| EP | 1841225 A3 | 3/2008 |
| WO | WO 2021/136268 A1 | 7/2021 |

OTHER PUBLICATIONS

"Android implements the View style that follows the finger drag and automatically sticks to the edge (example demo)"; https://www.jb51.net/article/102952.htm; JB51.Net Inc .; Jan. 2017; accessed Apr. 29, 2022; 7 pages (English Translation).

* cited by examiner

VIDEO PROCESSING METHOD AND APPARATUS, AND TERMINAL AND STORAGE MEDIUM

CROSS-REFERENCE TO RELATED APPLICATIONS

This application is the U.S. National Stage of International Application No. PCT/CN2020/124038, filed on Oct. 27, 2020, which based on the Chinese patent application with the application number of 201911047128.2, filed on Oct. 30, 2019, and the Chinese patent application with the application number of 201911047107.0, filed on Oct. 30, 2019, and claims the priority of the above-mentioned Chinese patent applications, the entire contents of which are hereby incorporated by reference.

TECHNICAL FIELD

The embodiments of the disclosure relate to the field of computer technology, in particular to a video processing method and apparatus, and terminal and storage medium.

BACKGROUND

Current video processing methods are poor in diversity, which also limits subsequent presentation and editing methods. Therefore, further improvement is needed to enhance user experience.

SUMMARY

This Summary is provided to introduce concepts in a simplified form that are described in detail in the Detailed Description section that follows. This summary section is not intended to identify key features or essential features of the claimed technical solution, nor is it intended to be used to limit the scope of the claimed technical solution.

In order to solve the above problems, the present disclosure provides a video processing method and apparatus, and terminal and storage medium. The method of the present disclosure utilizes cameras on both sides of the terminal to perform video recording simultaneously, which improves the video recording method, provide more flexible options for the presentation and clips of videos.

An embodiment of the present disclosure provides a video processing method, comprising: turning on a first camera on a first side and a second camera on a second side of a terminal in response to a first preset operation, wherein the first side and the second side are opposite or have different directions; and performing video recording by using the first camera and the second camera simultaneously.

An embodiment of the present disclosure provides a video processing device, comprising: a control module, configured to turn on a first camera on a first side and a second camera on a second side of a terminal in response to a preset operation, wherein the first side and the second side are opposite or have different directions; and a video recording module, configured to use the first camera and the second camera for simultaneous video recording.

An embodiment of the present disclosure provides a multimedia data playing method, comprising: receiving multimedia data to be played, wherein the multimedia data to be played comprises a first multimedia data stream, a second multimedia data stream and a corresponding timeline, and the timeline comprises a time period, which indicates whether the first multimedia data stream or the second multimedia data stream is output in a preset area in the corresponding time period, or whether the first multimedia data stream or the second multimedia data stream is in a preset output state in the corresponding time period.

Outputting the first multimedia data stream or the second multimedia data stream correspondingly in the preset area according to the timeline, or outputting the first multimedia data stream or the second multimedia data stream according to the preset output state.

An embodiment of the present disclosure provides a multimedia data editing method, comprising: receiving multimedia data to be edited, wherein the multimedia data to be edited comprises at least two multimedia data streams and a corresponding timeline, and the timeline indicates which one of the at least two multimedia data streams is output in a corresponding output area in a corresponding time period or which one of the at least two multimedia data streams is in a preset output state in a corresponding time period.

Editing the multimedia data to be edited based on the timeline and the at least two multimedia data streams.

An embodiment of the present disclosure provides a terminal, comprising: at least one memory and at least one processor; wherein the memory is used for storing program codes, and the processor is used for calling the program codes stored in the memory to execute the video processing method above.

In a video processing method of the disclosure, by using cameras on two sides of a terminal for video recording, a video recording method is improved, allowing more flexible choices for video presentation and editing.

BRIEF DESCRIPTION OF THE DRAWINGS

The above and other features, advantages and aspects of various embodiments of the disclosure will become more apparent in combination with the accompanying drawings and with reference to the following detailed description. Throughout the drawings, the same or similar reference numerals refer to the same or similar elements. It should be understood that the drawings are schematic, and components and elements are not necessarily drawn to scale.

DETAILED DESCRIPTION OF THE EMBODIMENTS

Figure 1:
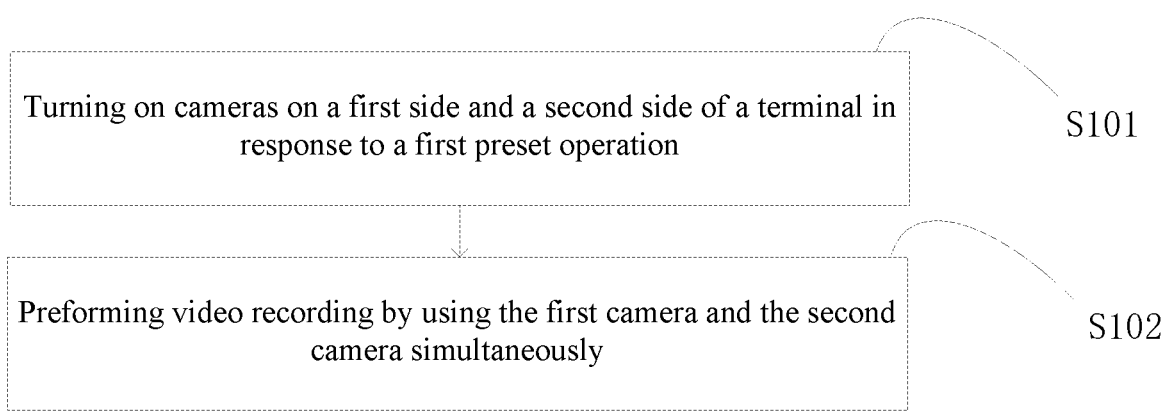
FIG. 1 is a flowchart of a video processing method according to an embodiment of the disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather are provided for the purpose of A more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, i.e., "including but not limited to". The term "based on" is "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order of functions performed by these devices, modules or units or interdependence.

It should be noted that the modifications of "a" and "a plurality" mentioned in the present disclosure are illustrative rather than restrictive, and those skilled in the art should understand that unless the context clearly indicates otherwise, they should be understood as "one or a plurality of". multiple".

The current video recording method of the terminal is relatively limited in application scenarios. For example, when shooting a beautiful scenery, if you want to capture the feelings expressed or what the photographer wants to say, you can only shoot the perfect scene, and then point the camera at the photographer himself or switch the camera used for shooting (for example, switch from rear to forward). This shooting experience is not friendly. In addition, this shooting method cannot reproduce the beautiful scenery and the picture of the photographer at the same moment, and the application scene is relatively limited.

In the present disclosure, a smartphone is taken as an example for description to better understand the present disclosure. However, it should be understood that the terminals in the present disclosure may include, but are not limited to, such as mobile phones, smart phones, notebook computers, PDAs (personal digital assistants), PADs (tablets), PMPs (portable multimedia players), navigation devices, vehicle-mounted terminals Mobile terminal equipment such as equipment, vehicle display terminal, vehicle electronic rearview mirror, etc., and fixed terminal equipment such as digital TV, desktop computer, etc.

FIG. 1 provides a flowchart of an example method for video recording according to an embodiment of the disclosure. The method of the disclosure includes step S101, turning on a first camera (e.g., a rear camera) on a first side and a second camera (e.g., a front camera) on a second side of a terminal (e.g., a mobile phone or other filming tools, such as a video camera) in response to a first preset operation, wherein the first side and the second side are opposite or have different directions, e.g., the first side and the second side may form a certain angle, or the filming directions of the first camera and the second camera may form a certain angle. The method of the disclosure also includes step S102, preforming video recording by using the first camera and the second camera simultaneously.

In some embodiments, turning on both the first camera and the second camera may include turning on two cameras at the same time, or turning on one camera first and then turning on the other camera in response to the first preset operation, so that the two cameras are turned on. In some embodiments, two cameras, that is, the front camera and the rear camera, are turned on at the same time. When the front camera and the rear camera are turned on at the same time, two video streams may be obtained. Further, the video stream obtained by the front camera may be referred to as a first video stream, and the video stream obtained by the rear camera may be referred to as a second video stream. Because the front camera and the rear camera are turned on and off at the same time, the first video stream and the second video stream contain different video data in the same time period. A user may preview the recording effect through a screen while the video streams are obtained.

In some embodiments, the first preset operation may include a voice command, a key operation, etc., which enables the first camera and the second camera to be turned on. In the disclosure, the first side and the second side of the terminal include but are not limited to a front side and a back side of the terminal, so that the first camera and the second camera include but are not limited to the front camera and the rear camera of the terminal. In addition, the first camera and the second camera respectively include one or more lenses. In addition, when the first camera or the second camera includes a plurality of lenses, it is not necessary that all the lenses need to work, instead, only some lenses may work, and the other lenses may be in an idle or unavailable state. In some embodiments, the video recording mode is improved by using the cameras on the two sides of the terminal for simultaneous video recording, allowing more flexible choices for video presentation and editing. For example, since the cameras on the two sides are used for simultaneous video recording, filming information from different angles on a same timeline may be obtained, thus providing multi-dimensional information to be edited for video presentation and editing easily and quickly, and reducing the complexity of information obtaining without increasing hardware cost.

In some embodiments, during video recording, because the first camera and the second camera are both turned on for video recording, the first camera and the second camera respectively generate one video image, that is, two video files are generated from one time of video recording. A picture taken by the first camera forms the first video stream, and a picture taken by the second camera forms the second video stream. Therefore, two video streams may be generated for subsequent playing and editing.

In some embodiments, an audio stream may also be obtained by video recording, and is used to be synthesized with the first video stream and/or the second video stream, so that the obtained video has corresponding audio. During video recording, one audio file and two video files are obtained in the same time period. The audio file and the two video files may be independent, that is, they do not interfere with each other. For example, a microphone may be used to obtain the audio file, and the first camera and the second camera may each obtain one video file. By obtaining the two video streams and the audio stream in corresponding time periods, more flexible choices may be provided for video presentation and editing in the later stage, so that users can implement various editing ideas. It should be understood that not only may the audio file obtained during video recording be synthesized with the corresponding video file, but also other audio files and the filmed video file may be synthesized and edited, etc. For example, other audio files include audio stream obtained by an audio recording device, other audio files stored locally or audio files obtained from the network, etc. Therefore, more flexible choices may be provided for video presentation and editing in the later stage, so that users can implement various editing ideas. In some embodiments, by taking smart phones as an example, in the embodiment of the disclosure, an audio stream may be obtained synchronously while the front camera and the rear camera are turned on to obtain two video streams. The way to obtain the audio stream is, for example, through a microphone, and the microphone may be turned on and off synchronously with the camera, so that the obtained audio stream has the same duration as the video stream. Furthermore, in some embodiments, the obtained audio stream may also be an existing audio stream, such as an audio file stored by a user or downloaded from the network. In this case, the duration of the audio file may be longer or shorter than that of the video stream, and the audio file and the video stream may be combined by editing or splicing subsequently. The obtained audio file may be specifically one or more pieces of combined background music or narration, which is not limited in the embodiment.

In some embodiments, during video recording, the terminal may display the first video stream obtained by the first camera and the second video stream obtained by the second camera, for example, when the terminal is a mobile phone, the first video stream and the second video stream are displayed in a display screen of the mobile phone. In some embodiments, the terminal simultaneously displaying the first video stream and the second video stream may include: determining display area information of the first video stream and the second video stream, and then displaying the first video stream in a first area and the second video stream in a second area according to the display area information. Specifically, the display area of each video stream may be determined by a processor of the terminal, and then the video streams are displayed in the first area and the second area according to the determined display areas. In some embodiments, a size of the first area is different from that of the second area. That is, the display areas of the first video stream and the second video stream are different in size. In some embodiments, the first area is located in the second area, for example, a picture-in-picture video, and at the moment, the first area may cover part of the second area. In some embodiments, the first area and the second area have no overlapping part. For example, the first video stream and the second video stream are displayed in a split screen manner.

Figure 2:
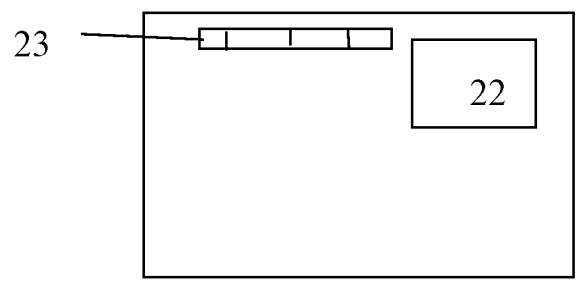
FIG. 2 is a schematic diagram of a video display mode according to an embodiment of the disclosure.
Figure 3:
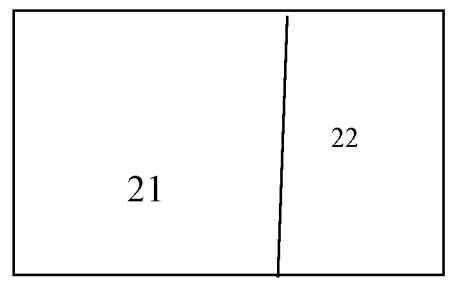
FIG. 3 is a schematic diagram of a video display mode according to an embodiment of the disclosure.

For example, FIG. 2 shows a first video stream 21 and a second video stream 22 displayed in a picture-in-picture manner, wherein the second video stream 22 occupies part of the picture in the first video stream 21, that is, covers part of the picture in the first video stream 21. FIG. 3 shows a first video stream 21 and a second video stream 22 displayed in a split screen manner, wherein the first video stream 21 and the second video stream 22 respectively occupy part of the display screen. In some embodiments, when the first video stream 21 and the second video stream 22 are displayed in a split screen manner, the display areas of the first video stream 21 and the second video stream 22 may be the same or different. In some embodiments, the display area of one of the first video stream 21 and the second video stream 22 is larger than that of the other of the first video stream 21 and the second video stream 22 when the first video stream 21 and the second video stream 22 are displayed in a picture-in-picture or split screen manner. For example, as shown in FIG. 2 and FIG. 3, the display area of the first video stream 21 is larger than that of the second video stream 22. In the embodiment of the disclosure, the display area of the first video stream 21 corresponds to the above-mentioned second area, and the display area of the second video stream 22 corresponds to the above-mentioned first area. In some embodiments, which area is for displaying the respective video streams may be selected through preset.

In some embodiments, when the first area is located in the second area (i.e., displaying in a picture-in-picture manner), the first area may be located at a corner of the second area, or the first area may be located in an area with the least influence on the content displayed in the second area. For example, in some embodiments, when displayed in a picture-in-picture manner, a smaller picture may be absorbed onto four corners of a larger picture, for example, as shown in FIG. 2. In some embodiments, a location of the smaller picture is realized by intelligent recognition, that is, the smaller picture is absorbed onto a position that has less influence on the display of the larger picture, for example, a position where people and scenery are scarce in the larger picture or a blank location.

In some embodiments, during video recording, by displaying the first video stream and the second video stream in the terminal at the same time, the content of the videos obtained by the cameras may be watched in time, allowing users to easily select the filming direction or content during video recording.

Figure 6:
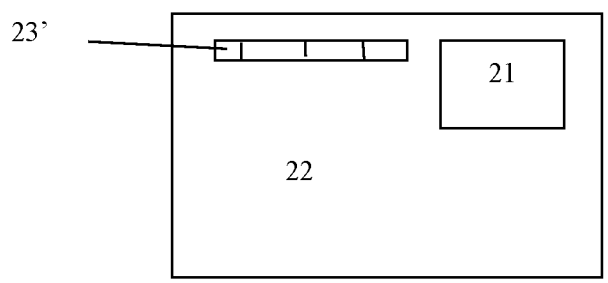
FIG. 6 is a schematic diagram of a video display mode according to an embodiment of the disclosure.
Figure 7:
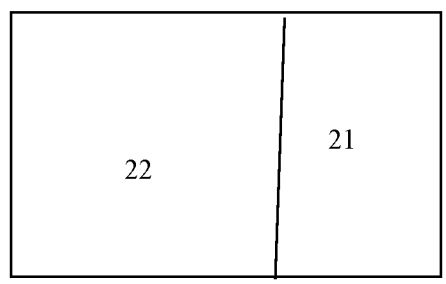
FIG. 7 is a schematic diagram of a video display mode according to an embodiment of the disclosure.
Figure 8:
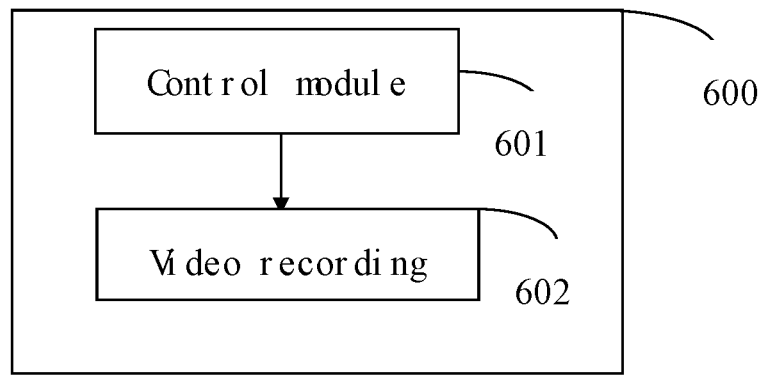
FIG. 8 is a schematic diagram of a video processing device according to an embodiment of the disclosure.

In some embodiments, during video recording, the display areas of the first video stream 21 and the second video stream 22 may be switched in response to a second preset operation. For example, the second preset operation may include a click trigger, a slide trigger, a voice command, etc., on the display areas of the first video stream 21 and the second video stream 22. FIGS. 6 and 7 show the display areas of the first video stream 21 and the second video stream 22 after switching corresponding to FIG. 2 and FIG. 3 respectively.

In some embodiments, the video processing method further comprises: positioning a display area of the second area to obtain a preset area of the display area of the second area so as to enable the first area to be located in the preset area, wherein the second area overlaps the first area, and an area of the first area is smaller than that of the second area.

In some embodiments, the first area is movable. The video processing method further includes: moving the first area to the preset area when it is recognized that the first area is moved and placed at other positions than the preset area in the display area of the second area.

In some embodiments, the preset area includes a plurality of corner positions. The video processing method further includes: moving the first area to a nearest corner position among the plurality of corner positions when it is recognized that the first area is moved and placed at other positions than the plurality of corner positions in the display area of the second area.

Figure 4:
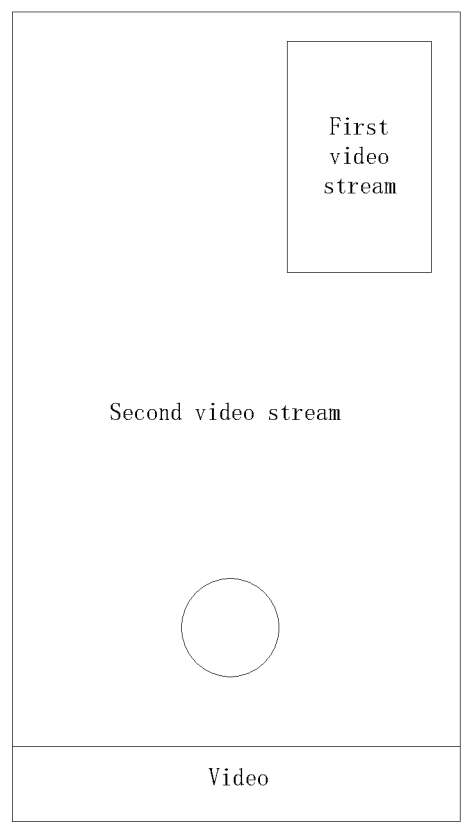
FIG. 4 is a schematic diagram of a video display mode according to an embodiment of the disclosure.
Figure 5:
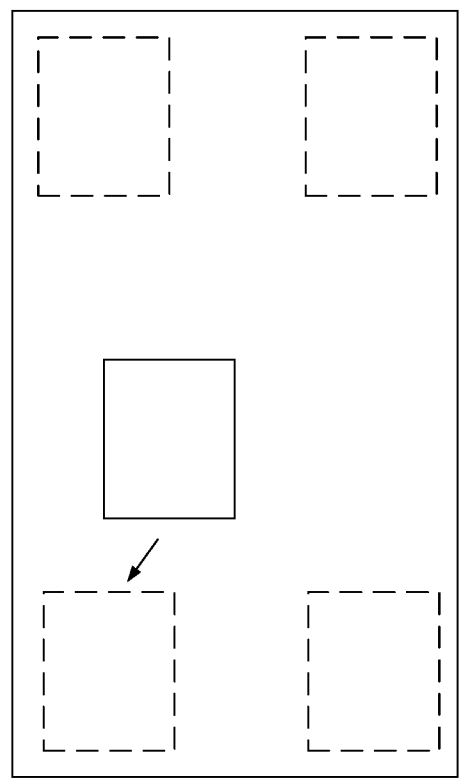
FIG. 5 is a schematic diagram of a video display mode according to an embodiment of the disclosure.

In some embodiments, an example that the front camera obtains the first video stream and the rear camera obtains the second video stream can be still used. For details, please refer to FIG. 4, FIG. 4 includes a bottom window that is located at a lower layer and used for playing, for example, the second video stream obtained by the rear camera, and further includes a floating window that is located at an upper right corner and used for playing the first video stream obtained by the front camera. It should be noted that there is no fixed corresponding relationship between the video streams and the windows. In some embodiments, the bottom window may play the first video stream and the floating window may play the second video stream; or, switching may be performed on the video stream corresponding to each window according to the user's choice, is triggered by starting a switching control by touching the floating window, or is started by any other reasonable way. As mentioned above, the audio stream played synchronously may be either an audio stream obtained on the spot, or incidental music or narration added later, which will not be described in detail here. In addition, in some embodiments, the floating window is movable, that is, a user may drag the floating window to other positions of the display screen to avoid blocking the key information of the bottom window. The floating window may stop at any dragging position. In some embodiments, the floating window may also stay in the preset area, and when the floating window is dragged to an area other than the preset area, the floating window may automatically return to the preset area. Specifically, in some embodiments, the preset area may be a corner position, for example, a conventional rectangular display screen includes four corner positions, as shown by dotted lines in FIG. 5. FIG. 5 is a schematic diagram of a stop position of a floating window according to an embodiment of the disclosure. In FIG. 5, the floating window may be located at any one of the four corner positions. Generally, in a video, the center of an image is often the position where the key information is located. The key information can prevented be from being shielded by arranging the floating window at the corner position. If the floating window is dragged to other positions than the four corner positions, a corner position closest to the floating window at the moment may be found by judging coordinates of the floating window, so that the floating window may automatically return. As shown by the arrow in FIG. 5, the floating window is closest to a lower left corner at the moment, so that the floating window automatically moves to the lower left corner and stops at the lower left corner. In the embodiment of the disclosure, a size of the floating window may be adjustable or non-adjustable. It can be understood that in order not to shield the playing of the bottom window, the floating window cannot completely cover the bottom window in size, that is, an area of the floating window needs to be less than that of the bottom window, and more preferably, the area of the floating window is less than one quarter of that of the bottom window. In the embodiment, the conventional rectangular screen is taken as an example to specifically illustrate the situation of the four corners positions, while other special-shaped screens may include more or less corner positions or preset areas other than the corner positions, which is not limited by the embodiment.

In some embodiments, during video recording, corresponding time periods during which the first video stream and the second video stream are displayed in the first area or the second area as time goes on are recorded, timelines for displaying the first video stream and the second video stream are obtained, and the timelines include switching time points at which the first video stream and the second video stream are displayed in the first area or the second area. Optionally, the terminal may record the time periods to obtain the timelines, or software may run on the terminal to record the time periods to obtain the timelines. As shown in FIG. 2, a timeline 23 is shown. The timeline 23 shows the corresponding time periods when the first video stream 21 and the second video stream 22 are displayed in one area (the second area corresponding to the first video stream 21 in FIG. 2).

The timeline 23 may also show a switching time point of the first video stream 21 and the second video stream 22, that is, show the time point at which video stream switching is conducted in the second area. For example, in the display area where the first video stream 21 of FIG. 2 is located, the first video stream 21 is displayed in a first time period, the second video stream 22 is displayed in a second time period, and the first video stream 21 is displayed in a third time period. With the switching of the display areas, the timeline 23 may record the time periods during which the first video stream 21 is displayed in the area and the time periods during which the second video stream 22 is displayed.

In some embodiments, different time periods on the timelines are represented by different visual elements, and different time periods correspond to different video streams or different display areas. In some embodiments, the visual elements may include color, line form, transparency, etc. For example, the time periods during which different video streams are displayed may be distinguished by different colors, for example, one time period is in red, another time period is in yellow, etc. In addition, when the video streams displayed in the corresponding areas are switched, the visual elements change accordingly. For example, as shown in FIG. 6, when the video streams displayed in the corresponding areas are switched, the color of the timeline 23 may change to obtain a timeline 23', for example, an original red part turns yellow and an original yellow part turns red, which is the result in response to the change of the video streams displayed in the corresponding areas. Further, it should be understood that although no timeline is shown in FIG. 3 and FIG. 7, corresponding timelines may still exist. In other embodiments, when output states of the first video stream and the second video stream are switched, the visual elements change accordingly, and the output state may include, for example, whether playing is performed, the playing effect (for example, whether background music is added, etc.), whether the volume changes, etc. For example, the brightness among the visual elements may remain unchanged while the video stream is played, and change dynamically when the video stream is paused.

By displaying the time period of the video stream displayed in a certain display area through timelines, the time point at which the video stream displayed in the display area is switched may be recorded, thereby facilitating that a user identifies which video stream is displayed in the current display area, and also providing a variety of flexible choices for presentation and editing modes in the later stage.

In some embodiments, during video recording, if the user switches the displayed picture or switches the output state of the displayed picture while watching the recorded video, the terminal records the latest timeline after switching. For example, during recording, the display screen of the terminal displays the first video stream and the second video stream in a picture-in-picture manner, the first video stream is displayed in a large picture in the first 10 sec, camera switching is conducted at the 10th sec, the second video stream is displayed in the large picture from the 10th sec to the 20th sec, and then the first video stream is displayed from the 20th sec to the 30th sec. During video recording, when the video is played or previewed, if the displayed picture is switched at the 5th sec, the first video stream is still be displayed in the large picture in the first 5 sec, the second video stream is displayed from the 5th sec to the 20th sec, and the first video stream is displayed from the 20th sec to the 30th sec. It should be understood that this is only exemplary, and switching may be conducted according to other rules as needed. In addition, during video recording, when the recorded video is played or previewed next time, the video may be displayed according to the latest timeline.

In some embodiments, when the recorded video is played during video recording, if the output states or display areas of the first video stream and the second video stream are switched, the terminal also records another timeline obtained after switching in addition to the timeline. That is, the terminal may record a plurality of timelines. Then, the user may select which timeline is to be used to display the first video stream and the second video stream. In some embodiments, after video recording is completed, the obtained first video stream 21 and/or second video stream 22 may be exported or shared to obtain an exported video, and the exported video may include at least one of the first video stream 21, the second video stream 22, a synthetic video with the first video stream 21 and the second video stream 22 or a picture-in-picture video with the first video stream 21 and the second video stream 22. That is, the exported video may be either a single video stream or a combined video of two video streams. In addition, these videos may be combined with audio during corresponding time periods. In the synthetic video with the first video stream 21 and the second video stream 22, the same video recording time point may include only one video stream, may also include two video streams, or a synthetic video corresponding to an audio stream obtained by synthesizing with an audio file in the corresponding time period. In a picture-in-picture video with the first video stream 21 and the second video stream 22, the first video stream 21 and the second video stream 22 are simultaneously displayed at each time point.

In some embodiments, when the exported video includes both the first video stream and the second video stream, the exported video also includes timeline information indicating whether the first video stream or the second video stream is displayed in the corresponding display area in the corresponding time period. The timeline may be the latest timeline updated by the terminal or a plurality of timelines recorded by the terminal. When the exported video is played, the user may select the corresponding timeline for play.

In addition, in the synthetic video and picture-in-picture video, there is a timeline showing which video stream is displayed in the display area. Through timeline differentiation, the user may easily know the video stream corresponding to a displayed video picture.

In addition, when users watch (e.g., play or preview) the synthetic video and picture-in-picture video, since the timeline is displayed in a manner of segments, the current video progress may be controlled by operating (e.g., clicking, dragging, etc.) the timeline, and the effect of quickly adjusting and selecting the watched video progress may also be achieved by previous-segment and next-segment options. For example, the user may click the position of the corresponding timeline to make the video quickly jump to be in the video progress at the corresponding time point. In addition, at a certain position of the timeline (for example, left, right, up, down and other appropriate positions of the timeline), previous-segment and next-segment options may be set. The user may quickly adjust the video progress through the options. In some embodiments, the segments are based on switching time points on the timeline. For example, when the previous-segment option is made, the video jumps to a start time point of a previous switching point in the current video progress. For example, the first video stream is played from the 10th sec to the 15th sec, the second video stream is played from the 15th sec to the 20th sec, the first video stream is played from the 20th sec to the 30th sec, and if the previous-segment option is made when the video is played to the 18th sec, the video jumps to the 10th sec and starts to be played from there; and if the next-segment option is made, the video jumps to the 20th sec and start to be played from there.

An embodiment of the disclosure also provides a video processing device 600, which includes a control module 601 and a video recording module 602. The control module 601 is configured to turn on both a first camera on a first side and a second camera on a second side of a terminal in response to a preset operation, wherein the first side and the second side are opposite or have different directions. The video recording module 602 is configured to use the first camera and the second camera for simultaneous recording.

In some embodiments, a multimedia data playing method is further provided, which includes: receiving multimedia data to be played, wherein the multimedia data to be played includes a first multimedia data stream, a second multimedia data stream and a corresponding timeline, and the timeline includes a time period which indicates whether the first multimedia data stream or the second multimedia data stream is output in a preset area in the corresponding time period, or whether the first multimedia data stream or the second multimedia data stream is in a preset output state in the corresponding time period. According to the timeline, the first multimedia data stream or the second multimedia data stream is correspondingly output in the preset area, or the first multimedia data stream or the second multimedia data stream is output according to the preset output state.

In some embodiments, the multimedia data may be video data or may also be audio data, for example, the first multimedia data stream may be a first soundtrack data stream, the second multimedia data stream may be a second soundtrack data stream, the first soundtrack data stream and the second soundtrack data stream are synthesized into a soundtrack data stream to be played, and the soundtrack data stream to be played is played or edited.

In some embodiments, the multimedia data includes video data, and the preset area includes a preset display area. When the multimedia data includes the video data, the multimedia data playing method may improve the processing efficiency of the picture display effect. In some embodiments, the multimedia data to be played may be the above-mentioned exported video including the first video stream and the second video stream, which will not be described in detail here. It should be understood that the timeline may be one timeline or may also be a plurality of timelines. When there are a plurality of timelines, a corresponding timeline may be selected to play the multimedia data.

In some embodiments, a time point at which an output multimedia data stream is controlled by operating the timeline, or a time point at which an output multimedia data stream in a preset output state is controlled by operating the timeline. For example, the timeline may be operated by sliding a position mark on the timeline or clicking the timeline. In some embodiments, the time point of the output multimedia data stream is controlled by selecting a previous time period and a next time period of the timeline through option buttons, or the time point of the multimedia data stream in the preset output state is controlled by selecting the previous time period and the next time period of the timeline through option buttons, and at the moment, the video may directly jump to the previous time period or the next time period through the option buttons.

In some embodiments, a multimedia data editing method is also provided, which includes: receiving multimedia data to be edited, wherein the multimedia data to be edited include at least two multimedia data streams and a corresponding timeline, and the timeline indicates which one of the at least two multimedia data streams is output in a corresponding output area in a corresponding time period or which one of the at least two multimedia data streams is in a preset output state in the corresponding time period. In some embodiments, the multimedia data to be edited may be the above-mentioned exported video including the first video stream and the second video stream, which will not be described in detail here. Then, based on the timeline and the at least two multimedia data streams, the multimedia data to be edited is edited.

In some embodiments, editing the multimedia data to be edited includes: resetting the presentation modes of the at least two multimedia data streams. For example, a synthesized video may be changed to a picture-in-picture video and vice versa. In some embodiments, editing the multimedia data stream to be edited includes: adjusting the timeline to obtain another timeline. For example, a switching time point of the display area may be changed to get a new timeline, so as to obtain multimedia data such as videos presented in a different way. In some embodiments, editing the multimedia data to be edited includes: changing a switching time point between time periods to obtain another timeline. For example, the switching time point of the first time period and the second time period is adjusted from the 3rd min to the 2nd min, so that the switching is performed at the 2nd min. In some embodiments, editing the multimedia data to be edited includes: modifying a playing effect identifier associated with the time period to obtain a multimedia data stream with a corresponding output effect. For example, if an identifier of a certain playing effect is moved from the first time period to the second time period, when the multimedia data is output, the multimedia data stream corresponding to the second time period is output according to the playing effect. The multimedia data stream may be a video stream or an audio stream. The above-mentioned multimedia data may include video data, audio data, etc.

In addition, the disclosure also provides a terminal including at least one memory and at least one processor, wherein the memory is used for storing program codes, and the processor is used for calling the program codes stored in the memory to execute the video processing method.

In addition, the disclosure also provides a computer storage medium which stores program codes for executing the video processing method.

In some embodiments, the video recording method is improved by using cameras on two sides of the terminal for simultaneous video recording, so that more flexible choices may be provided for video presentation and editing. In addition, during video recording, two video streams may be displayed at the same time, allowing the user to know and master captured pictures conveniently. Besides, by displaying multiple video streams through timelines, the user may conveniently know which video stream is played in the current area, and control the video progress and edit the video later.

Figure 9:
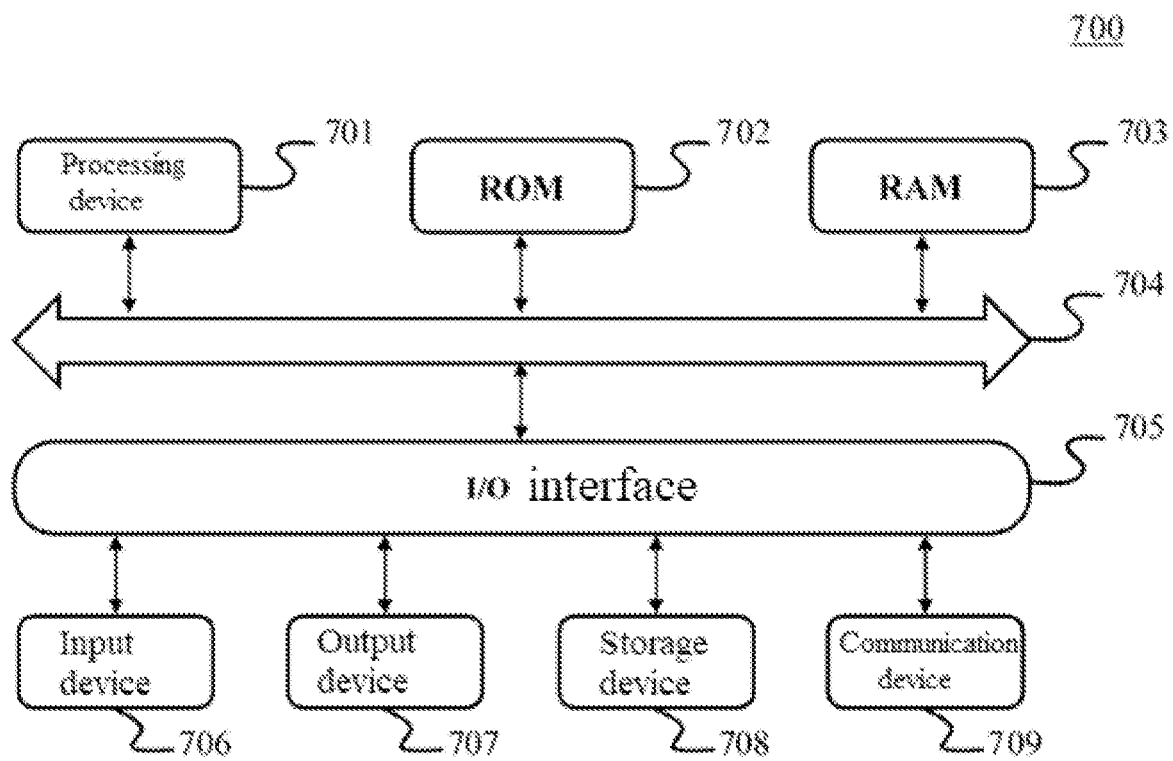
FIG. 9 is a schematic structural diagram of electronic equipment 700 for implementing an embodiment of the disclosure.

Referring next to FIG. 9, it shows a schematic structural diagram of an electronic device 700 suitable for implementing an embodiment of the present disclosure. Terminal devices in the embodiments of the present disclosure may include, but are not limited to, mobile phones, notebook computers, digital broadcast receivers, PDAs (Personal Digital Assistants), PADs (Tablet Computers), PMPs (Portable Multimedia Players), vehicle-mounted terminals (eg, mobile terminals such as in-vehicle navigation terminals), etc., and stationary terminals such as digital TVs, desktop computers, and the like. The electronic device shown in FIG. 9 is only an example, and should not impose any limitation on the function and scope of use of the embodiments of the present disclosure.

As shown in FIG. 9, an electronic device 700 may include a processing device (eg, a central processing unit, a graphics processor, etc.) 701 that may be loaded into random access according to a program stored in a read only memory (ROM) 702 or from a storage device 708 Various appropriate actions and processes are executed by the programs in the memory (RAM) 703. In the RAM 703, various programs and data necessary for the operation of the electronic device 700 are also stored. The processing device 701, the ROM 702, and the RAM 703 are connected to each other through a bus 704. An input/output (I/O) interface 705 is also connected to bus 704.

Typically, the following devices may be connected to the I/O interface 705: input devices 706 including, for example, a touch screen, touchpad, keyboard, mouse, camera, microphone, accelerometer, gyroscope, etc.; including, for example, a liquid crystal display (LCD), speakers, vibration. An output device 707 of a computer, etc.; a storage device 706 including, for example, a magnetic tape, a hard disk, etc.; and a communication device 709. Communication device 709 may allow electronic device 700 to communicate wirelessly or by wire with other devices to exchange data. While FIG. 9 shows electronic device 700 having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product comprising a computer program carried on a non-transitory computer readable medium, the computer program containing program code for performing the method illustrated in the flowchart. In such an embodiment, the computer program may be downloaded and installed from the network via the communication device 609, or from the storage device 708, or from the ROM 702. When the computer program is executed by the processing device 701, the above-mentioned functions defined in the methods of the embodiments of the present disclosure are executed.

It should be noted that the computer-readable medium mentioned above in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination of the above. In this disclosure, a computer-readable storage medium may be any tangible medium that contains or stores a program that can be used by or in conjunction with an instruction execution system, apparatus, or device. In the present disclosure, however, a computer-readable signal medium may include a data signal propagated in baseband or as part of a carrier wave with computer-readable program code embodied thereon. Such propagated data signals may take a variety of forms, including but not limited to electromagnetic signals, optical signals, or any suitable combination of the foregoing. A computer-readable signal medium can also be any computer-readable medium other than a computer-readable storage medium that can transmit, propagate, or transport the program for use by or in connection with the instruction execution system, apparatus, or device. Program code embodied on a computer readable medium may be transmitted using any suitable medium including, but not limited to, electrical wire, optical fiber cable, RF (radio frequency), etc., or any suitable combination of the foregoing.

In some embodiments, the client and server can use any currently known or future developed network protocol such as HTTP (HyperText Transfer Protocol) to communicate, and can communicate with digital data in any form or medium Communication (eg, communication network) interconnection. Examples of communication networks include local area networks ("LAN"), wide area networks ("WAN"), the Internet (eg, the Internet), and peer-to-peer networks (eg, ad hoc peer-to-peer networks), as well as any currently known or future development network of.

The above-mentioned computer-readable medium may be included in the above-mentioned electronic device; or may exist alone without being assembled into the electronic device.

The above-mentioned computer-readable medium carries one or more programs, and when the above-mentioned one or more programs are executed by the electronic device, the electronic device: obtains at least two Internet Protocol addresses; A node evaluation request for an Internet Protocol address, wherein the node evaluation device selects an Internet Protocol address from the at least two Internet Protocol addresses and returns it; receives the Internet Protocol address returned by the node evaluation device; wherein, the obtained The Internet Protocol address indicates an edge node in the content distribution network.

Or, the above computer-readable medium carries one or more programs, and when the one or more programs are executed by the electronic device, the electronic device: receives a node evaluation request including at least two Internet Protocol addresses; From the at least two Internet Protocol addresses, the Internet Protocol address is selected; the selected Internet Protocol address is returned; wherein, the received Internet Protocol address indicates an edge node in the content distribution network.

Computer program code for performing operations of the present disclosure may be written in one or more programming languages, including but not limited to object-oriented programming languages—such as Java, Smalltalk, C++, and This includes conventional procedural programming languages—such as the "C" language or similar programming languages. The program code may execute entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN) or a wide area network (WAN), or may be connected to an external computer (eg, using an Internet service provider via Internet connection).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code that contains one or more logical functions for implementing the specified functions executable instructions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or operations, or can be implemented in a combination of dedicated hardware and computer instructions.

The units involved in the embodiments of the present disclosure may be implemented in a software manner, and may also be implemented in a hardware manner. Wherein, the name of the unit does not constitute a limitation of the unit itself under certain circumstances, for example, the first obtaining unit may also be described as "a unit that obtains at least two Internet Protocol addresses".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and more.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination of the foregoing. More specific examples of machine-readable storage media would include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination of the foregoing.

According to one or more embodiments of the present disclosure, provides a video processing method, comprising: turning on a first camera on a first side and a second camera on a second side of a terminal in response to a first preset operation, wherein the first side and the second side are opposite or have different directions; and performing video recording by using the first camera and the second camera simultaneously.

According to one or more embodiments of the present disclosure, wherein by the video recording, a first video stream is obtained through the first camera, and a second video stream is obtained through the second camera.

According to one or more embodiments of the present disclosure, wherein an audio stream is also obtained by the video recording, wherein the audio stream is used to be synthesized with the first video stream and/or the second video stream, so that an obtained video has corresponding audio.

According to one or more embodiments of the present disclosure, wherein during the video recording, the first video stream and the second video stream are displayed simultaneously.

According to one or more embodiments of the present disclosure, wherein displaying the first video stream and the second video stream simultaneously comprises: determining display area information of the first video stream and the second video stream, and displaying the first video stream in a first area and displaying the second video stream in a second area according to the display area information.

According to one or more embodiments of the present disclosure, wherein a size of the first area is different from that of the second area; or the first area is located in the second area; or the first area and the second area have no overlapping part.

According to one or more embodiments of the present disclosure, wherein in response to a second preset operation, display areas of the first video stream and the second video stream are switched.

According to one or more embodiments of the present disclosure, further comprising: positioning a display area of the second area to obtain a preset area of the display area of the second area so as to enable the first area to be located in the preset area, wherein the second area overlaps the first area, and an area of the first area is smaller than that of the second area.

According to one or more embodiments of the present disclosure, wherein the first area is movable, and the method further comprises: moving the first area to the preset area when it is recognized that the first area is moved and placed at other positions than the preset area in the display area of the second area.

According to one or more embodiments of the present disclosure, wherein the preset area comprises a plurality of corner positions, and the method further comprises: moving the first area to a nearest corner position among the plurality of corner positions when it is recognized that the first area is moved and placed at other positions than the plurality of corner positions in the display area of the second area.

According to one or more embodiments of the present disclosure, wherein during the video recording, corresponding time periods during which the first video stream and the second video stream are displayed in the first area or the second area as time goes on are recorded, timelines for displaying the first video stream and the second video stream are obtained, and the timelines comprise switching time points at which the first video stream and the second video stream are displayed in the first area or the second area.

According to one or more embodiments of the present disclosure, wherein the first video stream and/or the second video stream obtained by video recording is exported to obtain an exported video, which comprises at least one of: the first video stream, the second video stream, a synthetic video with the first video stream and the second video stream or a picture-in-picture video with the first video stream and the second video stream.

According to one or more embodiments of the present disclosure, wherein when the exported video comprises both the first video stream and the second video stream, the exported video also comprises timeline information indicating whether the first video stream or the second video stream is displayed in a corresponding display area in a corresponding time period.

According to one or more embodiments of the present disclosure, wherein when the first area is located in the second area, the first area is located at a corner of the second area, or the first area is located in an area with the least influence on content displayed in the second area.

According to one or more embodiments of the present disclosure, wherein different time periods on the timeline are represented by different visual elements, and different time periods correspond to different video streams or different display areas.

According to one or more embodiments of the present disclosure, wherein when output states or display areas of the first video stream and the second video stream are switched, the visual element changes accordingly.

According to one or more embodiments of the present disclosure, wherein when a recorded video is played during the video recording, in the case that the output states or display areas of the first video stream and the second video stream are switched, the terminal updates the timeline accordingly and records an updated timeline.

According to one or more embodiments of the present disclosure, wherein when a recorded video is played during the video recording, in the case that the output states or display areas of the first video stream and the second video stream are switched, the terminal also records another timeline obtained after the switching in addition to the timeline.

According to one or more embodiments of the present disclosure, wherein a time point of a displayed video is controlled by operating the timeline.

According to one or more embodiments of the present disclosure, wherein the timeline is displayed in a manner of segments, and a time point of a displayed video is controlled by selecting a previous segment and a next segment of the timeline through option buttons.

According to one or more embodiments of the present disclosure, provides a video processing device, comprising: a control module, configured to turn on a first camera on a first side and a second camera on a second side of a terminal in response to a preset operation, wherein the first side and the second side are opposite or have different directions; and a video recording module, configured to use the first camera and the second camera for simultaneous video recording.

According to one or more embodiments of the present disclosure, provides a multimedia data playing method, comprising: receiving multimedia data to be played, wherein the multimedia data to be played comprises a first multimedia data stream, a second multimedia data stream and a corresponding timeline, and the timeline comprises a time period, which indicates whether the first multimedia data stream or the second multimedia data stream is output in a preset area in the corresponding time period, or whether the first multimedia data stream or the second multimedia data stream is in a preset output state in the corresponding time period.

Outputting the first multimedia data stream or the second multimedia data stream correspondingly in the preset area according to the timeline, or outputting the first multimedia data stream or the second multimedia data stream according to the preset output state.

According to one or more embodiments of the present disclosure, wherein the multimedia data comprises video data, and the preset area comprises a preset display area.

According to one or more embodiments of the present disclosure, wherein a time point of an output multimedia data stream is controlled by operating the timeline, or a time point of an output multimedia data stream in the preset output state is controlled by operating the timeline.

According to one or more embodiments of the present disclosure, wherein a time point of an output multimedia data stream is controlled by selecting a previous time period and a next time period of the timeline through option buttons, or a time point of a multimedia data stream in the preset output state is controlled by selecting the previous time period and the next time period of the timeline through the option buttons.

According to one or more embodiments of the present disclosure, provides a multimedia data editing method, comprising:

Receiving multimedia data to be edited, wherein the multimedia data to be edited comprises at least two multimedia data streams and a corresponding timeline, and the timeline indicates which one of the at least two multimedia data streams is output in a corresponding output area in a corresponding time period or which one of the at least two multimedia data streams is in a preset output state in a corresponding time period.

Editing the multimedia data to be edited based on the timeline and the at least two multimedia data streams.

According to one or more embodiments of the present disclosure, wherein editing the multimedia data to be edited comprises: resetting presentation modes of the at least two multimedia data streams; or adjusting the timeline to obtain another timeline.

According to one or more embodiments of the present disclosure, wherein editing the multimedia data to be edited comprises: modifying a playing effect identifier associated with the time period to obtain a multimedia data stream with a corresponding output effect, or changing a switching time point between time periods to obtain another timeline.

According to one or more embodiments of the present disclosure, provides a terminal, comprising: at least one memory and at least one processor; wherein the memory is used for storing program codes, and the processor is used for calling the program codes stored in the memory to execute the video processing method above.

According to one or more embodiments of the present disclosure, provides a computer storage medium, storing program codes for executing the video processing method above.

The above description is merely a preferred embodiment of the present disclosure and an illustration of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, the technical solutions formed by the above-mentioned technical features or Other technical solutions formed by any combination of its equivalent features. For example, a technical solution is formed by replacing the above features with the technical features disclosed in the present disclosure (but not limited to) with similar functions.

Additionally, although operations are depicted in a particular order, this should not be construed as requiring that the operations be performed in the particular order shown or in a sequential order. Under certain circumstances, multitasking and parallel processing may be advantageous. Likewise, although the above discussion contains several implementation-specific details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or logical acts of method, it is to be understood that the subject matter defined in the appended claims is not necessarily limited to the specific features or acts described above. Rather, the specific features and acts described above are merely example forms of implementing the claims.

What is claimed is:

1. A video processing method, comprising:
   turning on a first camera on a first side and a second camera on a second side of a terminal in response to a first preset operation, wherein the first side and the second side are opposite or have different directions;
   performing video recording by using the first camera and the second camera simultaneously;
   obtaining, by the video recording, a first video stream through the first camera and a second video stream through the second camera; and
   displaying the first video stream and the second video stream simultaneously during the video recording, wherein the displaying the first video stream and the second video stream simultaneously comprises:
      determining display area information of the first video stream and the second video stream, and
      displaying the first video stream in a first area and displaying the second video stream in a second area according to the display area information;
   wherein during the video recording, corresponding time periods during which the first video stream and the second video stream are displayed in the first area or the second area as time goes on are recorded, timelines for displaying the first video stream and the second video stream are obtained, and the timelines comprise switching time points at which the first video stream and the second video stream are displayed in the first area or the second area.

2. The video processing method according to claim 1,
   wherein an audio stream is also obtained by the video recording, wherein the audio stream is used to be synthesized with at least one of the first video stream or the second video stream, so that an obtained video has corresponding audio; or
   wherein at least one of the first video stream or the second video stream obtained by video recording is exported to obtain an exported video, which comprises at least one of: the first video stream, the second video stream, a synthetic video with the first video stream and the second video stream or a picture-in-picture video with the first video stream and the second video stream.

3. The video processing method according to claim 1, wherein a size of the first area is different from that of the second area; or
   the first area is located in the second area, wherein when the first area is located in the second area, the first area is located at a corner of the second area, or the first area is located in an area with the least influence on content displayed in the second area; or
   the first area and the second area have no overlapping part.

4. The video processing method according to claim 1,
   wherein in response to a second preset operation, display areas of the first video stream and the second video stream are switched; or
   the video processing method further comprising:

positioning a display area of the second area to obtain a preset area of the display area of the second area so as to enable the first area to be located in the preset area, wherein the second area overlaps the first area, and an area of the first area is smaller than that of the second area.

5. The video processing method according to claim 4, wherein the first area is movable, and the method further comprises:
moving the first area to the preset area when it is recognized that the first area is moved and placed at other positions than the preset area in the display area of the second area.

6. The video processing method according to claim 1, wherein at least one of the first video stream or the second video stream obtained by video recording is exported to obtain an exported video, which comprises at least one of: the first video stream, the second video stream, a synthetic video with the first video stream and the second video stream or a picture-in-picture video with the first video stream and the second video stream; when the exported video comprises both the first video stream and the second video stream, the exported video also comprises timeline information indicating whether the first video stream or the second video stream is displayed in a corresponding display area in a corresponding time period.

7. The video processing method according to claim 1, wherein different time periods on the timeline are represented by different visual elements, and different time periods correspond to different video streams or different display areas; when output states or display areas of the first video stream and the second video stream are switched, the visual element changes accordingly.

8. The video processing method according to claim 1, wherein when a recorded video is played during the video recording, in the case that output states or display areas of the first video stream and the second video stream are switched, the terminal updates the timeline accordingly and records an updated timeline; or
when a recorded video is played during the video recording, in the case that the output states or display areas of the first video stream and the second video stream are switched, the terminal also records another timeline obtained after the switching in addition to the timeline; or
a time point of a displayed video is controlled by operating the timeline; or
the timeline is displayed in a manner of segments, and a time point of a displayed video is controlled by selecting a previous segment and a next segment of the timeline through option buttons; or
different time periods on the timeline are represented by different visual elements, and different time periods correspond to different video streams or different display areas.

9. A video processing method, comprising:
turning on a first camera on a first side and a second camera on a second side of a terminal in response to a first preset operation, wherein the first side and the second side are opposite or have different directions;
performing video recording by using the first camera and the second camera simultaneously;
obtaining, by the video recording, a first video stream through the first camera and a second video stream through the second camera;
displaying the first video stream and the second video stream simultaneously during the video recording, wherein the displaying the first video stream and the second video stream simultaneously comprises:
determining display area information of the first video stream and the second video stream, and
displaying the first video stream in a first area and displaying the second video stream in a second area according to the display area information;
wherein the video processing method further comprises:
positioning a display area of the second area to obtain a preset area of the display area of the second area so as to enable the first area to be located in the preset area, wherein the second area overlaps the first area, an area of the first area is smaller than that of the second area, and the first area is movable, wherein the preset area comprises a plurality of corner positions, and the video processing method further comprises:
moving the first area to a nearest corner position among the plurality of corner positions when it is recognized that the first area is moved and placed at other positions than the plurality of corner positions in the display area of the second area.

10. A terminal, comprising:
at least one memory and at least one processor;
wherein the at least one memory is configured to store program codes, and the at least one processor is configured to execute the program codes stored in the at least one memory to perform operations comprising:
turning on a first camera on a first side and a second camera on a second side of a terminal in response to a first preset operation, wherein the first side and the second side are opposite or have different directions;
performing video recording by using the first camera and the second camera simultaneously;
obtaining, by the video recording, a first video stream through the first camera and a second video stream through the second camera; and
displaying the first video stream and the second video stream simultaneously during the video recording, wherein the displaying the first video stream and the second video stream simultaneously comprises:
determining display area information of the first video stream and the second video stream, and
displaying the first video stream in a first area and displaying the second video stream in a second area according to the display area information;
wherein during the video recording, corresponding time periods during which the first video stream and the second video stream are displayed in the first area or the second area as time goes on are recorded, timelines for displaying the first video stream and the second video stream are obtained, and the timelines comprise switching time points at which the first video stream and the second video stream are displayed in the first area or the second area.

11. The terminal according to claim 10, wherein an audio stream is also obtained by the video recording, wherein the audio stream is to be synthesized with at least one of the first video stream or the second video stream, such that an obtained video has corresponding audio; or
wherein at least one of the first video stream or the second video stream obtained by the video recording is exported to obtain an exported video, which comprises at least one of the first video stream, the second video stream, a synthetic video with the first video stream and the second video stream, or a picture-in-picture video with the first video stream and the second video stream.

12. The terminal according to claim 10, wherein a size of the first area is different from that of the second area; or
the first area is located in the second area, wherein when the first area is located in the second area, the first area is located at a corner of the second area, or the first area is located in an area with the least influence on content displayed in the second area; or
the first area and the second area have no overlapping part.

13. The terminal according to claim 10, wherein in response to a second preset operation, display areas of the first video stream and the second video stream are switched; or
wherein the operations further comprise:
positioning a display area of the second area to obtain a preset area of the display area of the second area so as to enable the first area to be located in the preset area, wherein the second area overlaps the first area, and an area of the first area is smaller than that of the second area.

14. The terminal according to claim 13, wherein the first area is movable, and wherein the operations further comprise:
moving the first area to the preset area when it is recognized that the first area is moved and placed at other positions than the preset area in the display area of the second area.

15. The terminal according to claim 13, wherein the preset area comprises a plurality of corner positions, and wherein the operations further comprise:
moving the first area to a nearest corner position among the plurality of corner positions when it is recognized that the first area is moved and placed at other positions than the plurality of corner positions in the display area of the second area.

16. The terminal according to claim 10, wherein at least one of the first video stream or the second video stream obtained by the video recording is exported to obtain an exported video, which comprises at least one of the first video stream, the second video stream, a synthetic video with the first video stream and the second video stream, or a picture-in-picture video with the first video stream and the second video stream;
when the exported video comprises both the first video stream and the second video stream, the exported video also comprises timeline information indicating whether the first video stream or the second video stream is displayed in a corresponding display area in a corresponding time period.

17. The terminal according to claim 10, wherein different time periods on a timeline are represented by different visual elements, and different time periods correspond to different video streams or different display areas; when output states or display areas of the first video stream and the second video stream are switched, the visual element changes accordingly.

18. The terminal according to claim 10, wherein when a recorded video is played during the video recording, in response to determining that output states or display areas of the first video stream and the second video stream are switched, the terminal updates the timeline accordingly and records an updated timeline; or
when a recorded video is played during the video recording, in response to determining that the output states or display areas of the first video stream and the second video stream are switched, the terminal also records another timeline obtained after the switching in addition to the timeline; or
a time point of a displayed video is controlled by operating the timeline; or
the timeline is displayed in a manner of segments, and a time point of a displayed video is controlled by selecting a previous segment and a next segment of the timeline through option buttons; or
different time periods on the timeline are represented by different visual elements, and different time periods correspond to different video streams or different display areas.

19. A non-transitory computer-readable storage medium, storing computer-readable instructions that upon execution by a processor cause the processor to implement operations comprising:
turning on a first camera on a first side and a second camera on a second side of a terminal in response to a first preset operation, wherein the first side and the second side are opposite or have different directions;
performing video recording by using the first camera and the second camera simultaneously;
obtaining, by the video recording, a first video stream through the first camera and a second video stream through the second camera; and
displaying the first video stream and the second video stream simultaneously during the video recording, wherein the displaying the first video stream and the second video stream simultaneously comprises:
determining display area information of the first video stream and the second video stream, and
displaying the first video stream in a first area and displaying the second video stream in a second area according to the display area information;
wherein during the video recording, corresponding time periods during which the first video stream and the second video stream are displayed in the first area or the second area as time goes on are recorded, timelines for displaying the first video stream and the second video stream are obtained, and the timelines comprise switching time points at which the first video stream and the second video stream are displayed in the first area or the second area.

20. The non-transitory computer-readable storage medium according to claim 19, wherein at least one of the first video stream or the second video stream obtained by the video recording is exported to obtain an exported video, which comprises at least one of the first video stream, the second video stream, a synthetic video with the first video stream and the second video stream, or a picture-in-picture video with the first video stream and the second video stream;
when the exported video comprises both the first video stream and the second video stream, the exported video also comprises timeline information indicating whether the first video stream or the second video stream is displayed in a corresponding display area in a corresponding time period.

* * * * *